United States Patent

Luick et al.

[11] Patent Number: 6,088,769
[45] Date of Patent: *Jul. 11, 2000

[54] MULTIPROCESSOR CACHE COHERENCE DIRECTED BY COMBINED LOCAL AND GLOBAL TABLES

[75] Inventors: David Arnold Luick; John Christopher Willis; Philip Braun Winterfield, all of Rochester, Minn.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/724,628

[22] Filed: Oct. 1, 1996

[51] Int. Cl.[7] .................................................. G06F 12/00
[52] U.S. Cl. ........................ 711/141; 711/118; 711/146; 711/144; 711/124
[58] Field of Search ...................................... 711/118, 130, 711/165, 141, 146–148, 124, 152, 144

[56] References Cited

U.S. PATENT DOCUMENTS

| | | | |
|---|---|---|---|
| 4,747,043 | 5/1988 | Rodman | 395/925 |
| 4,843,542 | 6/1989 | Dashiell et al. | 364/200 |
| 4,928,225 | 5/1990 | McCarthy et al. | 364/200 |
| 5,025,365 | 6/1991 | Mathur et al. | 711/121 |
| 5,303,362 | 4/1994 | Butts, Jr. et al. | 711/121 |
| 5,490,261 | 2/1996 | Bean et al. | 711/121 |
| 5,537,569 | 7/1996 | Masubushi | 395/448 |
| 5,577,204 | 11/1996 | Brewer et al. | 710/132 |
| 5,590,308 | 12/1996 | Shih | 395/463 |
| 5,604,882 | 2/1997 | Hoover et al. | 395/448 |
| 5,623,628 | 4/1997 | Brayton et al. | 395/468 |
| 5,710,907 | 1/1998 | Hagersten et al. | 711/148 |
| 5,749,095 | 5/1998 | Hagersten | 711/141 |
| 5,751,995 | 5/1998 | Sarangdhar | 395/472 |
| 5,778,429 | 7/1998 | Sukegawa et al. | 711/129 |
| 5,822,763 | 10/1998 | Baylor et al. | 711/118 |
| 5,864,854 | 1/1999 | Boyle | 707/10 |
| 5,892,970 | 4/1999 | Hagersten | 711/141 |
| 5,895,487 | 4/1999 | Boyd et al. | 711/122 |
| 5,897,664 | 4/1999 | Nesheim et al. | 711/206 |

OTHER PUBLICATIONS

Leonidas I. Kontothanassis et al. "Lazy Release Consistency for Hardware–Coherent Multiprocessors", University of Rochester, 1994.

Sandra Johnson Baylor et al., "An Evaluation of Cache Coherence Protocols for MIN–Based Multiprocessors", International Symposium on Shared Memory Multiprocessing, pp. 230–241, Apr. 1991.

Proceedings of the 17th International Symposium on Computer Architecture, Jun. 1990, pp. 148–159, "The Directory–Based Cache Coherence Protocol for the DASH Multiprocessor" by Daniel Lenoski et al.

IEEE Computer, vol. 25, No. 03, Mar. 1992, pp. 63–79, "The Stanford Dash Multiprocessor" by Daniel Lenoski et al.

Primary Examiner—John W. Cabeca
Assistant Examiner—Pierre-Michel Bataille
Attorney, Agent, or Firm—Terrance A. Meador; David A. Hall; Karuna Ojanen

[57] ABSTRACT

A method and apparatus for maintaining coherence between shared data stored within a plurality of memory devices, each memory device residing in a different node within a tightly coupled multiprocessor system. Each node includes a "local coherence unit" and an associated processor. A cache unit is associated with each memory/processor pair. Each local coherence unit maintains a table which indicates whether the most current copy of data stored within the node resides in the local memory, in the local cache, or in a non-local cache. The present invention includes a "global coherence" unit coupled to each node via the logical interconnect. The global coherence unit includes a interconnect monitoring device and a global coherence table. When data which resides within the memory of a first node is transferred to a second node, the interconnect monitoring device updates the global coherence table to indicate that the data is being shared. The global coherence table also preferably indicates in which node a copy of the most current data resides.

6 Claims, 7 Drawing Sheets

FIG. 2A

| CACHE LINE 1 | CACHE LINE 2 | CACHE LINE 3 | ... | CACHE LINE n |
|---|---|---|---|---|
| 0 | 1 | 1 | ... | 0 |

| CACHE LINE 1 | CACHE LINE 2 | CACHE LINE 3 | ... | CACHE LINE n |
|---|---|---|---|---|
| 01 | 00 | 10 | ... | 00 |

| VIRTUAL ADDRESS | NODE 1 | NODE 2 | ... | NODE n |
|---|---|---|---|---|
| 000000 | 1 | 0 | 0 | 1 |
| ...... | | | | |
| 010100 | 1 | 1 | 0 | 0 |
| 010101 | 1 | 0 | 0 | 1 |
| ...... | | | | |
| 011110 | 0 | 1 | 1 | 1 |

205

MULTIPROCESSOR CACHE COHERENCE DIRECTED BY COMBINED LOCAL AND GLOBAL TABLES

BACKGROUND OF THE INVENTION

1. Field of the Invention

The present invention relates generally to computer cache schemes, and more particularly to a method and apparatus for maintaining coherence between memories within a system having distributed shared memory.

2. Description of the Related Art

Due to the demand for greater processing power, and due to the desire to have relatively small processors work cooperatively as a multi-processing system, there have been many attempts over the last several years to solve the problems inherent in maintaining coherence between memory devices which are accessible to more than one processing device. The coherence problem is exemplified by a system in which a single logical interconnect channel is shared by a plurality of memory devices, each paired with an associated processor to form a "tightly-coupled" multiprocessor system. Reference from a processor may be to addresses that are within the memory associated with the requesting processor or within a memory associated with another of the processors within the system.

Each processor is also associated with a local cache. The cache is a relatively small high speed memory device which allows data to be accessed rapidly. The cache is typically relatively small because the cost of such high speed memory is relatively high. However, in systems in which the processors are very long instruction word processors (VLIWs) the caches are unusually large, increasing the likelihood that information stored in a cache associated with a first processor may also be stored in the cache associated with at least a second processor. It should be understood that there is a tradeoff between the size and the speed of the cache.

Consider a cache that is a two level cache in which the first level of the cache is smaller and faster than the second level of the cache. Therefore, the data which is most likely to be required is maintained in the first level of the cache, and data which is less likely to be required is maintained in the second level of the cache. If data is required which is not present in either the first or the second level of the cache, then the data must be retrieved from the slower memory device. A number of different algorithms have been devised for determining what data to maintain in each level of the cache (i.e., anticipating what data is most likely to be required soon). However, a detailed understanding of such algorithms is not necessary for the purposes of the present discussion.

Since each processor has an associated cache, and each cache may have more than one level, care must be taken to ensure the coherence of the data that is maintained throughout the system. That is, if more than one cache may contain a copy of the same interval of shared, writable memory, a reasonable approach to parallel programming requires some provision for ensuring that all copies reflect a coherent value. One way to ensure that coherence is maintained is to maintain a directory (or table) which points to each non-local cache in which the data resides. By knowing the location of each copy of the data, each copy can either be updated, or a notation can be made within the table to indicate that the data at one or more locations is out-of-date. Such tables require pointers to multiple nodes which are caching data. However, maintaining one table which points to each copy within each node increases the complexity and the width of directory entries within such tables, making the table relatively large and complex.

Accordingly, it is an object of the present invention to provide a system and method for maintaining coherence of data stored in multiple caches within a multiprocessor system by storing relatively small and simple entries in coherence tables.

SUMMARY OF THE INVENTION

The present invention is a method and apparatus for maintaining coherence between shared data stored within a plurality of memory devices, each memory device residing in a different node within a tightly coupled multiprocessor system. Each of the nodes are coupled via a logical interconnect (such as a bus). Each node further includes a "local coherence unit", and a processor associated with the memory device and forming a memory/processor pair therewith. In accordance with one embodiment of the present invention, a cache unit is associated with each memory/processor pair to aid in reading and writing to each memory device. Each processor is capable of sharing data with each other processor, and reading and writing to addresses within any of the memory devices within the system. Data is considered to be "shared" when that data is stored in more than one node. For example, shared data may be stored in a memory device within a first node and within a cache within a second node. In addition, shared data may be stored in a memory device within a first node and within a memory device within a second node. Reading and writing to memory devices is preferably accomplished through the cache. However, in an alternative embodiment, no such cache is provided.

Each local coherence unit maintains a table which indicates whether the most current copy of data stored within the node resides in the local memory (i.e., the memory within the node in which the local coherence table resides), in the local cache (i.e., a cache within the node in which the local coherence table resides), or in a non-local cache (i.e., a cache within a node other than the node in which the local coherence table resides).

In addition to the plurality of nodes, the multiprocessor system of the present invention includes a "global coherence" unit coupled to each node via the logical interconnect. The global coherence unit includes a interconnect monitoring device and a global coherence table. The interconnect monitoring device monitors communications between the nodes and detects transfers of data from one node to another. When data which resides within the memory of a first node is transferred to a second node, the interconnect monitoring device updates the global coherence table to indicate that the data is being shared. The global coherence table also preferably indicates that a copy of the most current data resides within the second node. Data which resides within the memory of a first node and within the cache of a second node is referred to generally as shared data, and more particularly as "non-locally cached data". In accordance with one embodiment of the present invention, when data is transferred from a first node to a second, the local coherence table within the first node is updated to reflect that the most current copy resides in a non-local cache. If an attempt is made to modify the data, the modification will always be directed to be performed on only one copy of the data (the most current copy), and that copy will be well identified.

In an alternative embodiment of the present invention, the local coherence table is only updated if data shared by the node in which the table resides is modified. Accordingly, in accordance with such an embodiment, a processor which modifies shared data must send a message to each node with which the data is shared to indicate that the data stored therein is no longer current. The local coherence table within each such node is then updated to reflect that fact that the shared data is no longer current.

The use of local coherence tables and a global coherence table reduces the size and complexity of the coherence table that would otherwise be required. In addition, the present invention provides a means by which direct cache to cache transfers can be accomplished. Still further, by maintaining a local coherence table to indicate when shared data is current, use of the logical interconnect is reduced. That is, there is no need to inquire outside the node when the most current copy of requested data presently resides within the node.

The details of the present invention, both as to its structure and operation, can best be understood in reference to the accompanying drawings, in which like reference numerals refer to like parts, and in which:

BRIEF DESCRIPTION OF THE DRAWING

FIG. 2a is an illustration of the organization of a local coherence table in accordance with one embodiment of the present invention;

FIG. 2b is an illustration of the organization of a local coherence table in accordance with an alternative embodiment of the present invention;

FIG. 2c is an illustration of the organization of a local coherence table in accordance with another alternative embodiment of the present invention;

DETAILED DESCRIPTION OF THE PREFERRED EMBODIMENTS

The present invention is a method and apparatus that uses local coherence tables and a global coherence table to maintain coherence between data that is distributed throughout a tightly coupled computer system. The use of local coherence tables and a global coherence table reduces the size and complexity of the coherence table that would otherwise be required. In addition, the present invention provides a means by which direct cache to cache transfers can be accomplished. Still further, by maintaining a local coherence table to indicate when shared data is current, use of the logical interconnect is reduced. That is, there is no need to inquire outside the node when the most current copy of requested data presently resides within the node.

Functional Configuration of the Present Invention

Figure 1:
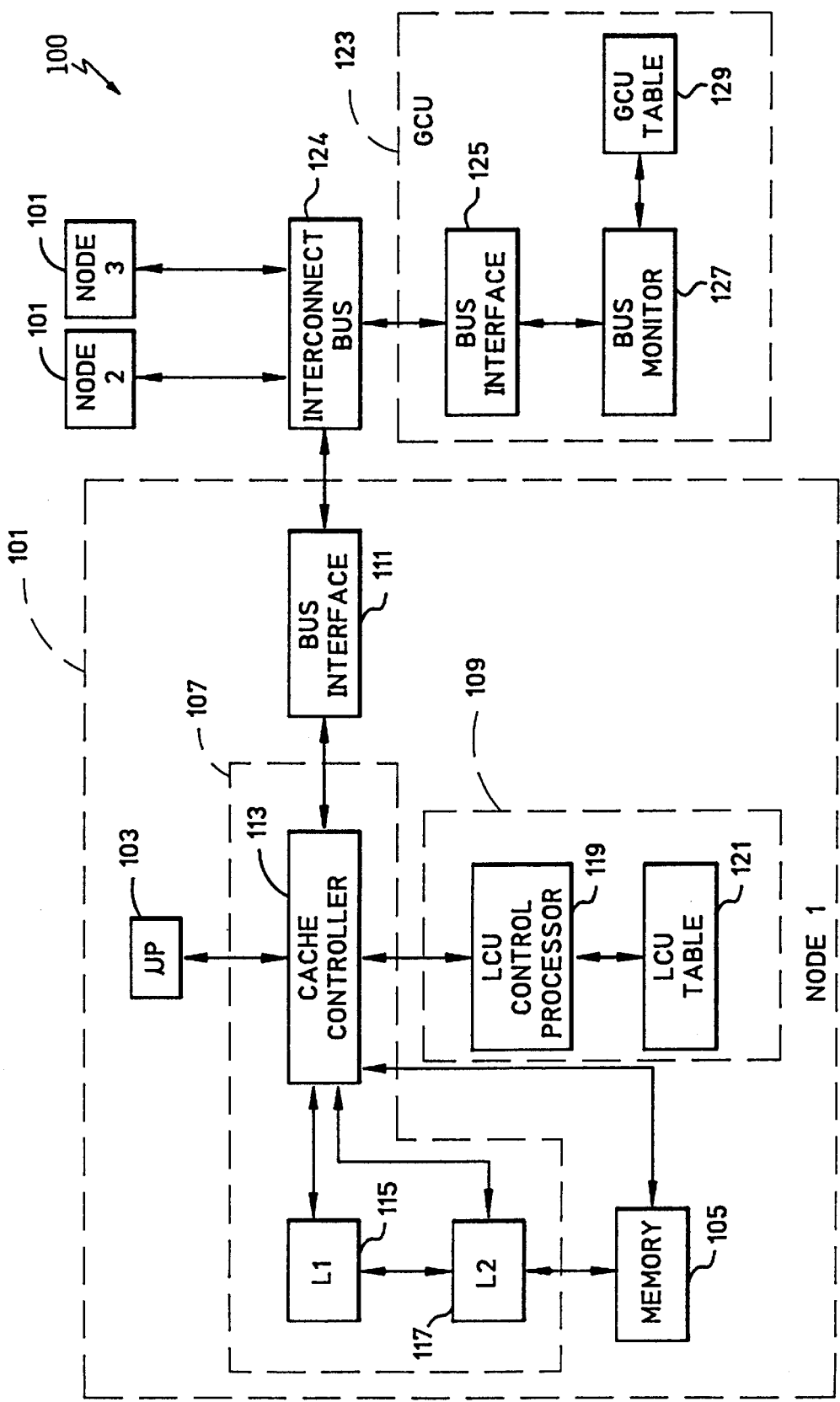
FIG. 1 is a functional block diagram of a tightly coupled multiprocessor system in accordance with the present invention.

FIG. 1 is a functional block diagram of a tightly coupled multiprocessor system 100 configured in accordance with the present invention. In accordance with the present invention, a plurality of nodes 101 are provided, each of which preferably include a processor 103, a memory 105, a cache 107, a local coherence unit (LCU) 109, and a bus interface 111. However, it should be understood that nodes in accordance with an alternative embodiment of the present invention may be provided without a cache. The processor 103 and memory 105 are collectively referred to as a memory/processor pair. The cache 107 is preferably a conventional cache including a cache controller 113, a first level cache memory 115, and a second level cache memory 117.

However, it should be understood that the cache may be any system or device which increases the speed at which information can be read from and/or written to memory by storing information in a faster and smaller memory device. For example, the cache 107 may be a single level cache, or may have more than two levels. Furthermore, the cache may be implemented using any type of memory device which has a read and write cycle that is fast with respect to the memory 105. Still further, any size "cache line" may be used. A cache line is defined as the minimum amount of data that is transferred into or out of the cache in a single transfer operation.

The LCU 109 includes a control processor 119 and a Local Coherence Table (LCT) 121. The LCT 121 preferably has one entry associated with each cache line stored within the memory 105. Alternatively, the size of each portion of memory that is associated with an entry to the LCT 121 may be smaller or larger than a cache line. The address of the portion of memory is used as an index into the LCT 121. This index may be either the virtual address or the effective address of the particular portion of data. Virtual addresses are uniquely assigned to each unique individually addressable portion of data within the system. Effective addresses are the physical addresses within each local memory 105 in each node. Therefore, the same effective address may be used in several different nodes 101 throughout the system to access different portions of data. Nonetheless, each portion of memory within a particular node has a unique effective address. Effective addresses from different nodes can each be mapped to one virtual address so that the data can be shared by different nodes. For example, data stored at effective address "101101" in a first node and effective address "10001" within a second node can each be mapped to virtual address "100000111101". In this way, data can be shared by the two processors within the two nodes, and yet may be stored locally within each node. The coherence tables of the present invention provide the means by which such shared data remains coherent. Accordingly, it will be understood that each virtual address is mapped to a unique effective address within only one node 101 unless two or more nodes share the same data, in which case each effective address at which such shared data is stored will be mapped to the same virtual address.

Each entry in the LCT 121 preferably also has one bit which indicates whether the contents of the memory 105 at the address associated with the entry is the most current copy of that data. The cache controller 113 maintains a record as to whether a copy of the contents of the memory 105 at each particular location is present within the cache 107. In accordance with the preferred embodiment of the present invention, the cache controller 113 is always consulted when data is requested by the processor 103 from memory 105. Therefore, if the LCT 121 indicates that the most current copy of the data stored at a particular address is locally available, the cache controller 113 will determine whether the most current copy of that data is present in the cache 107 or the memory 105.

In accordance with one embodiment of the present invention, the table maintained by the cache controller 113 and the table maintained by the LCT 121 may be combined. Accordingly, a single table may be maintained which indicates both whether the contents of a particular memory location is cached and whether the local copy stored in either the memory 105 or the cache 107 is the most current copy. Thus, the functions of the cache controller 113 and the control processor 119 may be combined, such that each entry in the LCT 121 indicates whether the most current copy of a particular cache line is available from the cache 107, the memory 105, or a source outside the node (i.e., either storage or a non-local cache (i.e., a cache within another node).

The bus interface 111 provides an interface between the node 101, other nodes 101, and a Global Coherence Unit (GCU) 123 via a logical interconnect 124 (such as a bus). The GCU 123 includes a bus interface 125, a interconnect monitor 127, and a Global Coherence Table (GCT) 129. The interconnect monitor 127 passively monitors the logical interconnect 124 to detect attempts by a first node to read data from, or write data to, a second node. When the interconnect monitor 127 detects that data is being written or read between two nodes, the interconnect monitor 127 updates the GCT 129 to indicate that the data is being shared by the two nodes. In accordance with one embodiment of the present invention, the GCT 129 is indexed by the virtual address of the shared data. The GCT 129 may be configured as a data base in which the key is the virtual address. When data is shared for the first time, a new entry to the GCT 129 is generated. Each entry indicates which nodes share the data (i.e., which nodes have an effective address that is mapped to the same virtual address). Likewise, when a node reads or writes to a virtual address for the first time, the node that reads, or the node to which data is written, is then added to the list of nodes that share that virtual address.

FIG. 2a is an illustration of the organization of an LCT 121 in accordance with one embodiment of the present invention. The LCT 121 in FIG. 2a has a single bit 201 associated with each cache line of data within the memory 105. In accordance with one embodiment, the bit is set to indicate that the current locally stored data at the address associated with that bit is not the most current copy of that data (i.e., that the data was read by another node and may have been modified in that node). Addresses associated with a bit are referred to herein as "cache line x", where x is a number from 1 to n, n being the total number of cache lines in memory 105. Accordingly, a first cache line of data (cache line 1) stored locally within the node 101 is the most current copy of that data, as indicated by the fact that the bit 201 is not asserted. However, the second cache line of data stored locally (cache line 2) may not be the most current copy of that data, since the bit associated with that cache line is asserted. In an alternative embodiment of the present invention, the bit is only asserted when a copy of the data associated with that bit has been modified in another node. In accordance with such an embodiment of the invention, the node which modifies the cache line must report that the modification has occurred to each of the nodes that share that data. While the overhead required to maintain the LCT 121 is greater in such an embodiment, the cache operates more efficiently, since the local cache in a first node can still be used after a second node reads the cache line from the first node, as long as no other node has modified the information. In the embodiment in which the LCT 121 bit 201 is asserted whenever that associated cache line has been read, the overhead is lower, since it is relatively easy for a local control processor 119 to determine when data has been read from the node in which that control processor 119 resides. In contrast, it is more complex for the control processor 119 to determine when another node has modified locally stored data.

The LCT 121 of FIG. 2a may be either directly or associatively mapped to the memory 105. For example, if the cache is organized in accordance with a "hashing" algorithm, then the LCT 121 may be organized in accordance with the same "hashing" algorithm used to determine the manner in which cache lines are organized within the cache. Hashing algorithms for determining the order in which cache lines are stored in caches are well known. Alternatively, the order of the entries may be either arbitrary, or may be the same as the order of the cache lines within the memory 105.

In an alternative embodiment of the present invention shown in FIG. 2b, entries to the LCT 121 indicate whether the most current copy of a cache line is presently maintained in the memory 105, the cache 107, or non-locally (i.e., in another node). For example, two bits 203 may be used to indicate where the most current copy of the cache line resides. In accordance with one embodiment, "00" indicates that the most current copy of the cache line resides within the local cache 107, "01" indicates that the most current copy of the cache line resides within the local memory 105, and "10" indicates that the most current copy of the cache line resides within another node.

One embodiment of the organization of the contents of the GCT 129 in accordance with the present invention is shown in FIG. 2c. The virtual address of each cache line which is currently being shared by more than one node 101 is maintained in the GCT 129. Alternatively, the table may be organized such that an entry is to be provided for each cache line which may possibly be shared, regardless of whether that virtual address is currently being shared. Preferably, associated with each entry are a plurality of bits 205 which indicate which nodes are currently sharing the associated virtual address. For example, in the table shown in FIG. 2c, the virtual address "000000" is shared by nodes 1 and n. The virtual address "010100" is shared by nodes 1 and 2, etc. In an alternative embodiment of the present invention, a bit pattern or code may be uniquely assigned to each node. This bit pattern is then stored in an entry associated with a virtual address to indicate that the node to which the code or pattern is assigned is one of the nodes that share that virtual address.

Read Operations in Accordance With the Present Invention

Figure 3:
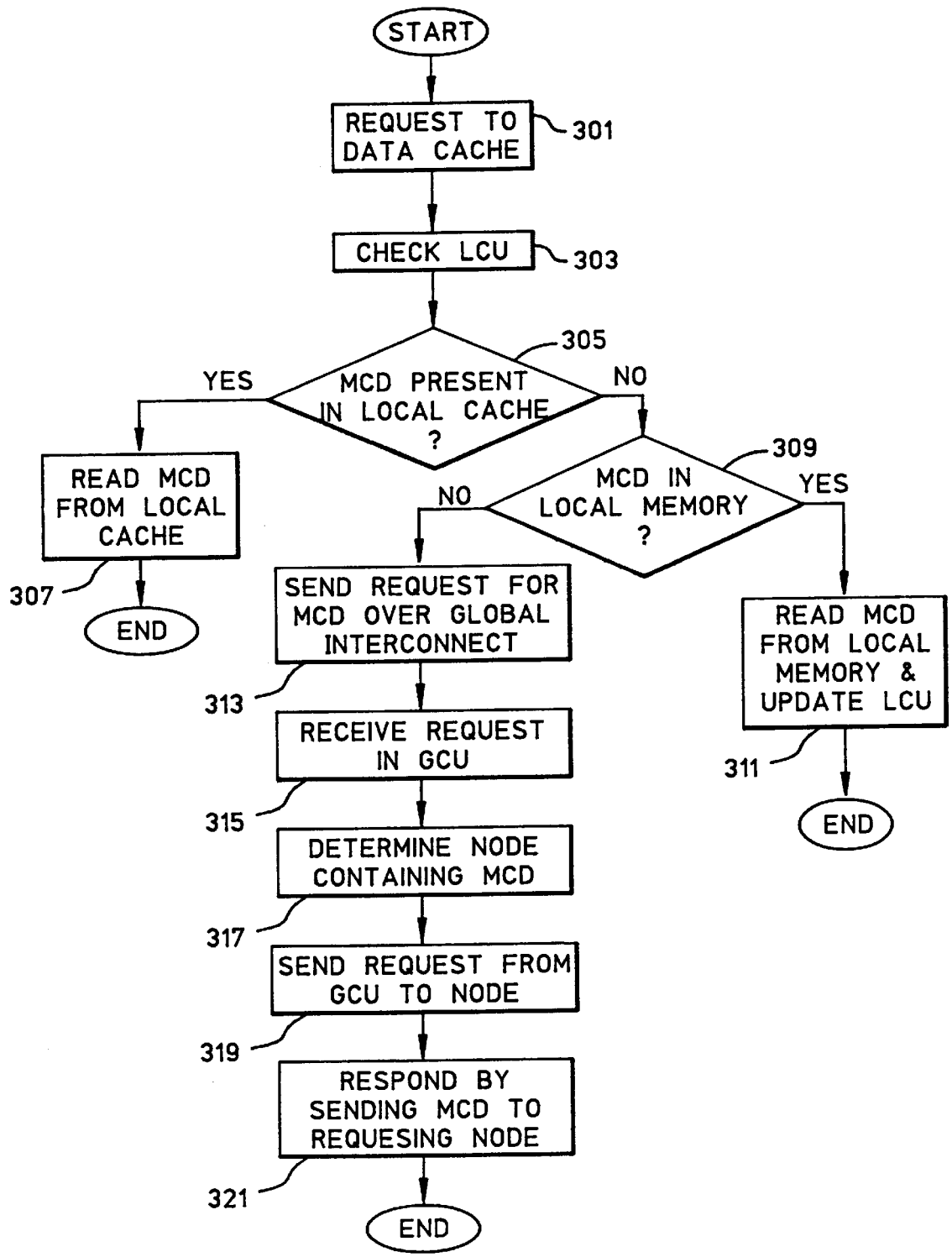
FIG. 3 is a flow chart of one embodiment of the inventive method for reading data.

FIG. 3 is a flow chart illustrating the method for reading data in a manner which ensures coherence in accordance with the present invention. Initially, the processor 103 within a first of the nodes 101 requests data from the cache controller 113 (STEP 301). As part of the request, the processor 103 provides the cache controller 113 with the virtual address of the data to be read. In an alternative embodiment of the present invention, the processor 103 provides the cache controller 113 with the effective address of the data to be read. In either case, the cache controller 113 determines whether the data to be read is present in a first level cache (L1) (STEP 303). Preferably, concurrent with STEP 303, the cache controller 113 provides the address to the control processor 119 to determine whether the most current copy of the data to be read resides locally (i.e., within the same node 101 as the requesting processor 103) (STEP 305). If the most current copy of the data is present within the local cache 107, then the data read request is serviced from the local cache (STEP 307) and the process ends.

If the most current copy of the data to be read is not in the local cache 107, then the cache controller 113 checks whether the data to be read resides within the memory 105 (STEP 309). If the cache controller 113 indicates that the data to be read resides within the memory 105, and the control processor 119 reads the LCT 121 and determines that the most current copy of the data to be read resides locally, then the data read request is serviced by the cache controller 113 copying the data from the memory 105 into the cache 107. The cache controller 113 then makes the data available to the processor 103 (STEP 311) and the process ends.

If the cache controller 113 determines that the data to be read is not stored within the memory 105 (STEP 309), or the control processor 119 determines that the copy that is stored in memory 105 is not the most current copy of the data (STEP 309), then the cache controller 113 requests the data over the logical interconnect 124 (STEP 313). In forming the request, the address of the data being requested must be a virtual address. The request is received by the GCU 123 (STEP 315). The GCU 123 then determines which node has the most current copy of the data to be read. It may be possible for more than one node to have the most current copy of the data to be read. In either case, the GCU 123 determines which node is to respond to the request (STEP 317). In accordance with the embodiment illustrated in FIG. 3, a request to service the read operation is then sent from the GCU 123 to the node which the GCU 123 has determined should respond (STEP 319). The request is received by the bus interface 111 over the logical interconnect 124 and coupled to the cache controller 113. The cache controller 113 and the LCU 109 determine where the most current copy of the data to be read resides. The cache controller 113 then transmits the data to be read over the logical interconnect 124 (STEP 321). The requesting node 101 receives the data in the bus interface 111. The data is coupled to the cache controller 113, which makes the data available to the requesting processor 103. In accordance with the preferred embodiment of the present invention, the data is transferred from cache to cache by the cache controllers 113 within the requesting node 101 and the node 101 from which the data is to be read. If the data to be read is not within the cache 107, then the cache controller 113 retrieves the data from local memory 105 and transmits the data directly to the cache controller 113 in the requesting node 101.

Figure 4:
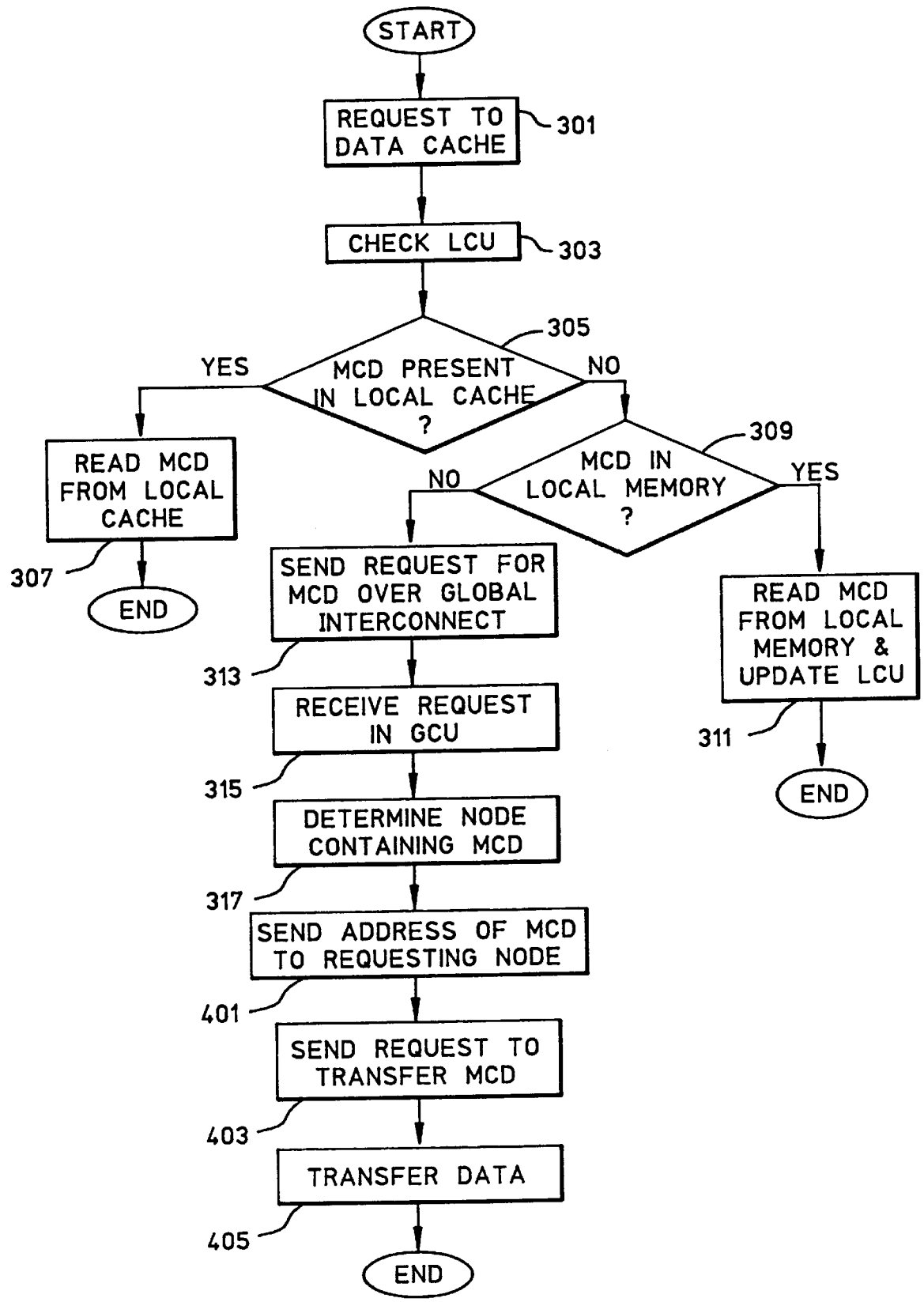
FIG. 4 is a flow chart of an alternative embodiment of the inventive method for reading data.

In an alternative embodiment of the present invention shown in FIG. 4, each of the steps 301–317 are performed as described above. However, once the GCU 123 determines which node is to respond to the request, the GCU 123 sends a message to the requesting node 101 (STEP 401) indicating which node 101 is designated to respond. The requesting node 101 then directly requests the designated node 101 to read the data and transfer the data to the requesting node 101 (STEP 403). In response, the designated node 101 reads the data and transfers the data directly to the requesting node 101 (STEP 405). In the preferred embodiment, the transfer is performed directly from cache to cache under the control of the respective cache controllers 113.

Figure 5:
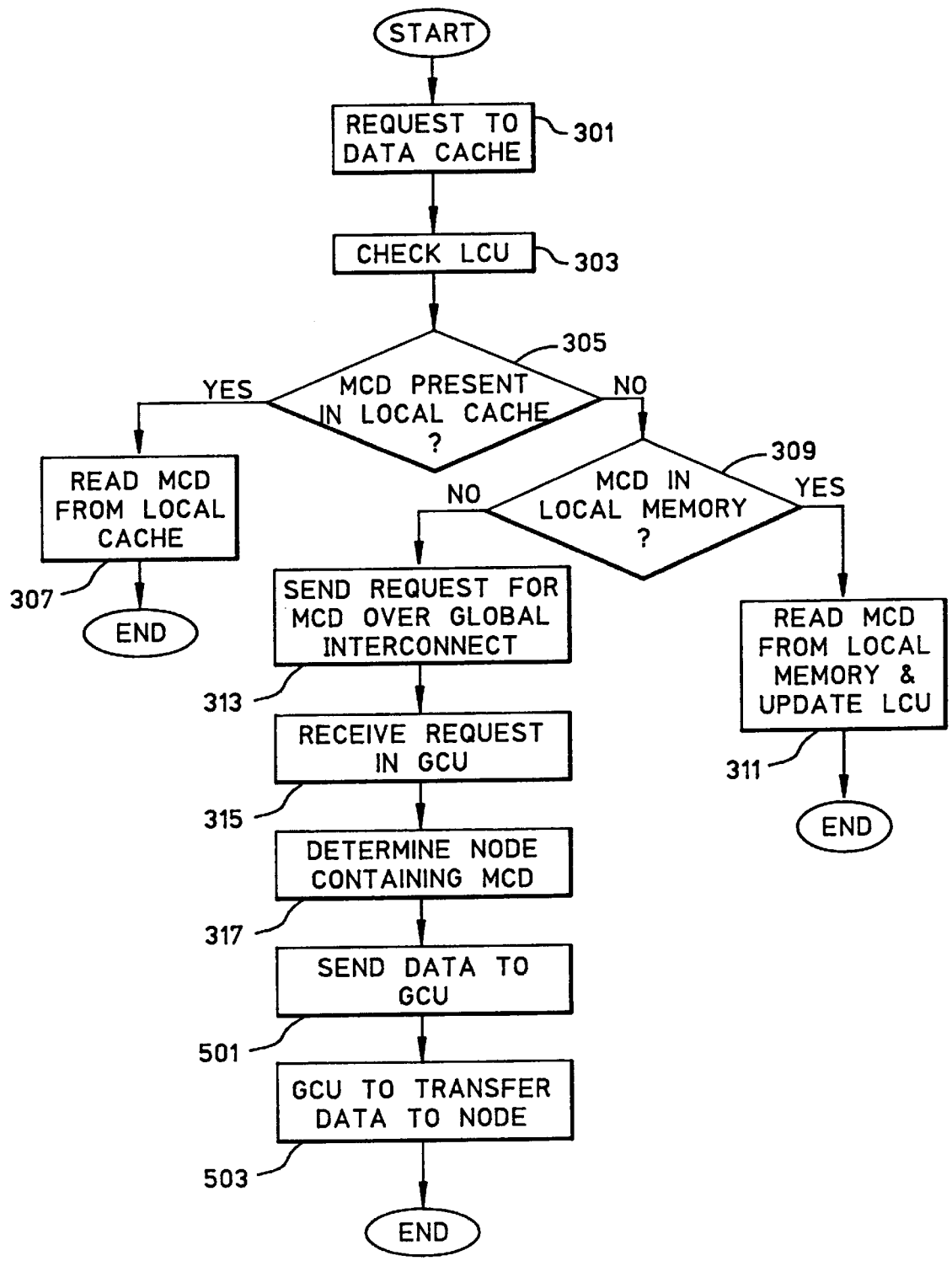
FIG. 5 is a flow chart of yet another alternative embodiment of the inventive method for reading data.

In yet another embodiment of the present invention, illustrated in FIG. 5, once the GCU 123 designates a node 101 to respond, the GCU 123 sends a request to the designated node 101. In response, the designated node 101 transfers the data to the GCU 123 (STEP 501). The GCU 123 then transfers the data to the requesting node 101 (STEP 503). It should be understood that direct transfers of data from one node 101 to another are more efficient. However, some architectures may require that data be sent only to the requesting device.

Write Operations in Accordance With the Present Invention

Figure 6:
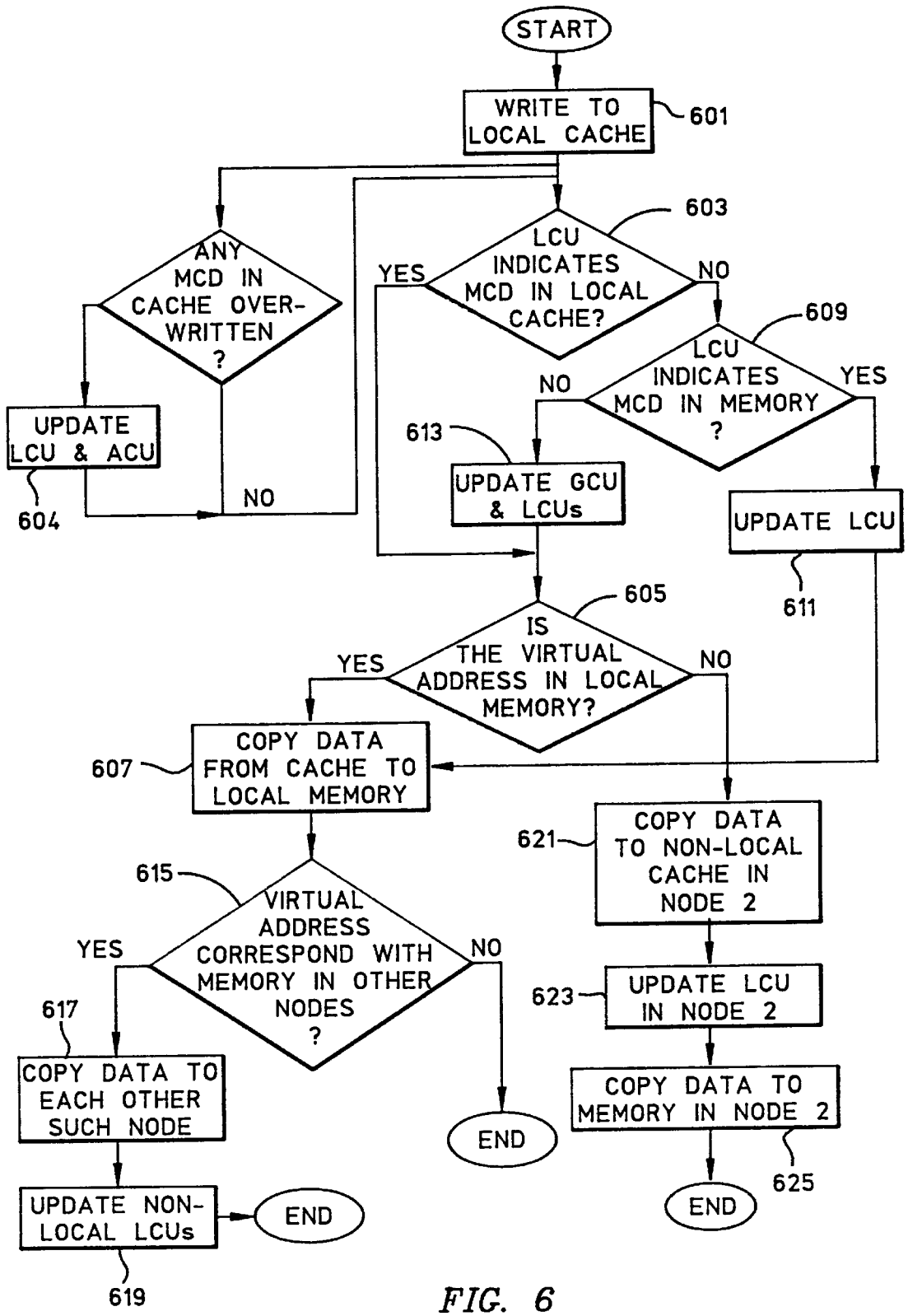
FIG. 6 is a flow chart of one embodiment of the inventive method for writing data.

FIG. 6 illustrates a method in accordance with the present invention for writing data while maintaining coherence between multiple copies of the data distributed throughout the system. Initially, a processor 103 within a first node writes the data to the associated cache 107 within the first node at a particular virtual address associated with the data (referred to hereinafter as the "write virtual address") (STEP 601). In some instances, when a first cache line is written to the cache 107, a second cache line that is already present in the cache 107 must be removed to make room for the first cache line. If the second cache line has not yet been copied back to at least one of the memories 105 in the system, then the cache controller 113 must ensure that the second cache line is copied back before removing the second cache line from the cache 107 in the first node. Operation of such copyback caches is well known in the art. In accordance with the present invention, when a current copy of data is to be copied back from a cache 107 to memory 105 and removed from the cache 107 (STEP 602), the LCU 109 or GCU 123 must be revised to indicate the new location of the current data (i.e., the LCU 109 must reflect that the current data resides in the memory 105) (STEP 604). Likewise, the GCU 123 is preferably updated when a copyback operation occurs from a cache 107 in one node to memory 105 in another node.

Next, a determination is made as to whether the LCU 109 within the first node indicates that a current copy of the data associated with the write virtual address resides within the cache 107 in the first node (STEP 603). If so, then a determination is made as to whether the virtual address of the data is mapped into an effective address within the memory 105 of the first node (i.e., whether data stored at the write virtual address is to be copied back to the local memory 105 (STEP 605). If so, then a current copy of the data is copied from the cache 107 in the first node to the memory 105 in the first node (STEP 607) in accordance with conventional copyback cache operations. In accordance with the preferred embodiment of the present invention, neither the LCU 109 or the GCU 123 need to be updated in response to a current copy of the data being copied from the cache 107 to the local memory 105, until the copy of the data is removed from the cache 107.

In accordance with one embodiment of the present invention, the GCU 123 is then checked to determine whether the data is shared with any other nodes 101 (STEP 615). That is, a determination is made as to whether the write virtual address is mapped to an effective memory location within any of the other nodes 101. If so, then a cache to cache copying operation is performed to update the copy of the data within each other node 101 that shares that data (STEP 617). Once the data has been copied from the cache 107 in the first node to a cache 107 within another node 101 that shares the data, the LCU 109 within each other node is preferably updated to indicate that a current copy of the data associated with the write virtual address is now present in the cache 107 within the first node (STEP 619). Alternatively, the data is only copied back to the local memory 105.

Returning to STEP 603, if the LCU 109 indicates that a current copy of the data associated with the write virtual address did not reside within the cache 107 in the first node before the write operation began (STEP 603), then the LCU 109 is checked to determine whether a current copy of the data resided within the memory 105 of the first node before the write operation began (STEP 609). If so, then the LCU 109 in the first node is updated to indicate that a current copy of the data associated with the write virtual address now resides within the cache 107 in the first node (STEP 611). The data is then copied from the cache 107 within the first node to the memory 105 within the first node in accordance with a conventional copyback cache operation (STEP 607). The process then continues with STEP 615 as described above.

Returning again to STEP 603, if the LCU 109 indicates that a current copy of the data did not reside within either the cache 107 or the memory 105 in the first node before the write operation began (STEP 609), then both the GCU 123 and the LCU 109 must be updated to indicate that a current copy of the data associated with the write virtual address now resides within the cache 107 in the first node (STEP 613). Once the LCU 109 and the GCU 123 have been updated, the process continues at STEP 605, as described above. If the write virtual address does not correspond to an effective address within the memory 105 in the first node (STEP 605), then the data is copied from the cache 107 in the first node to the cache 107 within each node 101 that shares the data at the write virtual address (i.e., each node in which the local memory 105 has an effective address corresponding to the write virtual address (STEP 621). The LCU 109 associated with each node that shares the data is then updated (STEP 623). Next, the data is copied from the cache 107 of each node that shares the data to the associated memory 105 (STEP 625) and the process ends.

Figure 7:
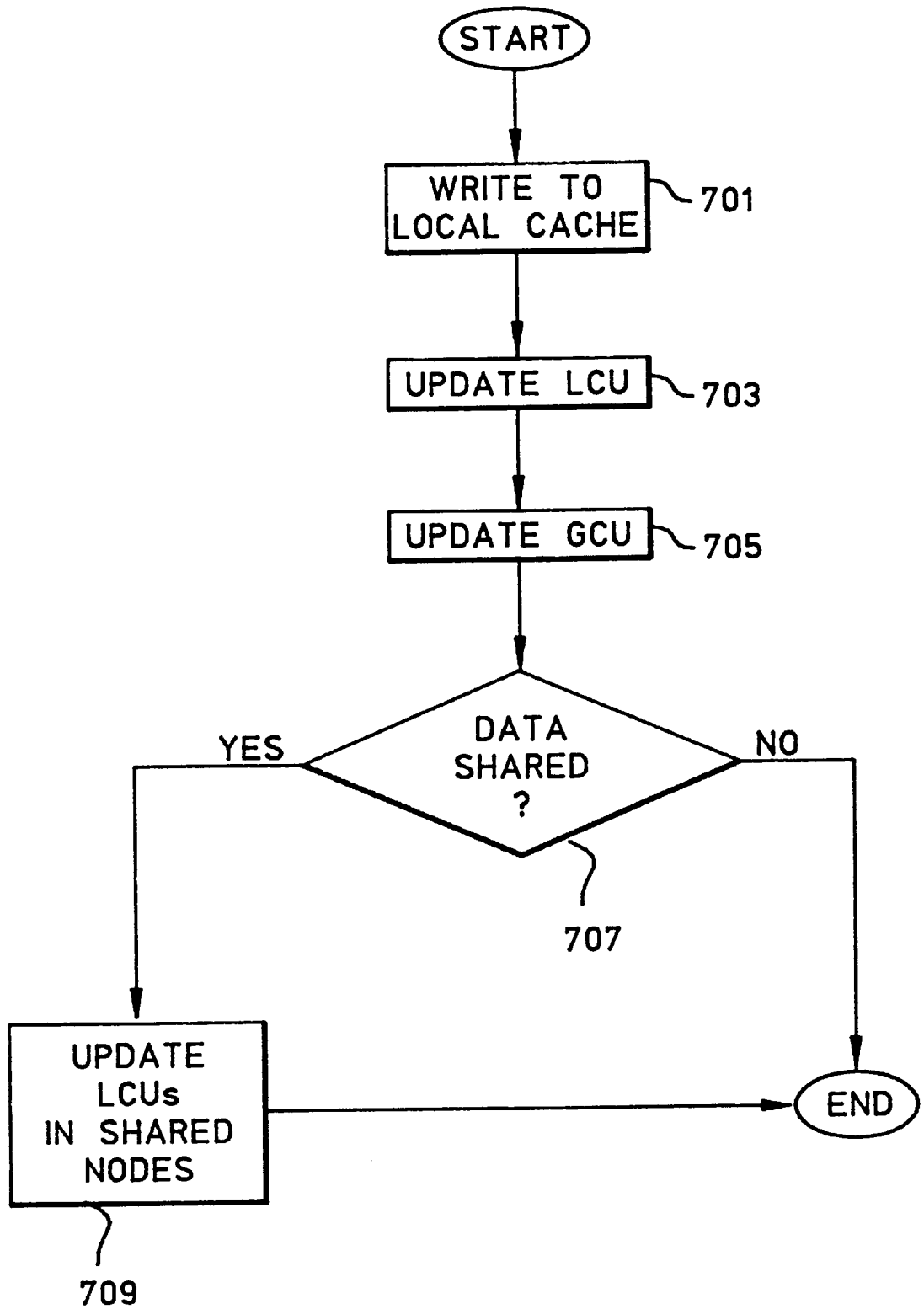
FIG. 7 is a flow chart of an alternative embodiment of the inventive method for writing data.

FIG. 7 illustrates an alternative embodiment to the write operation of the present invention shown in FIG. 6. As shown in the embodiment of FIG. 7, the data is initially written to a write virtual address by a processor within a first node to a cache 107 within the first node (STEP 701). The LCU 109 within the first node is then updated to indicate that the cache 107 has a current copy of the data associated with the write virtual address (STEP 703). In addition, the GCU 123 is updated to indicate that the first node has a current copy of the data associated with the write virtual address (STEP 705). Next, a determination is made as to whether the data is shared by checking the GCU 123. If the data is shared by another node 101 (STEP 707), then the LCU 109 within each node that shares the data must be updated to indicate that the data that is associated with the write virtual address and which is stored in node 101 in which the LCU 109 resides is no longer current (STEP 709). By always updating both the LCU 109 and the GCU 123 regardless of whether the LCU 109 and GCU 123 already indicate that a current copy of the data resides in the cache 107 of the first node, the procedure is greatly simplified. However, the number of writes via the interconnecting bus is increased. Furthermore, the number of updates to the LCU 109 is increased. However, it should be understood that the present invention will still provide the benefits of reducing the size of the coherence tables and read operations can be performed which using direct cache to cache transfers.

The particular system and method for maintaining coherence between memory devices and caches within a tightly coupled multiprocessor system as herein shown and described in detail is fully capable of attaining the objects of the invention. However, it should be understood that the described embodiment is merely an example of the present invention, and as such is representative of subject matter which is broadly contemplated by the present invention. For example, the present invention is described in the context of a system in which a copyback cache is provided. Nonetheless, the present invention may be used with any system having memory/processor pairs which requires coherence between shared data stored in more than one of the memories. Each node of a multiprocessor system in accordance with the present invention may be configured such that data may be directly written by a processor of one memory/processor pair to a memory device within another memory/processor pair without the aid of a cache. In such an embodiment of the present invention, a direct memory access controller, or the LCU control processor, may be used to directly copy information from the memory of a first node to the memory of a second node without the involvement of the processors in either node. Accordingly, the scope of the present invention fully encompasses other embodiments which may become apparent to those skilled in the art. Furthermore, the scope of the present invention is to be limited by nothing other than the appended claims.

We claim:

1. A method for maintaining cache coherence in a tightly coupled multiprocessor system having a plurality of nodes coupled to an interconnecting bus and storing portions of shared data, each node having a cache, a local coherence unit, a memory device and a processor device, the memory and processor device being coupled to form a memory/processor pair, the processor device within each node being capable of accessing data from the local memory device, the local cache, or over the interconnecting bus, from a non-local memory device, or a non-local cache, the method including the steps of:

(a) checking a local coherence unit to determine with a single data entry in a table whether a most current copy of a requested portion of data is stored locally, in response to a request by a requesting processor associated with that local coherence unit for the requested portion of data;

(b) if the most current copy of the requested portion of data is not stored locally, then checking a global coherence unit to determine in which node the most current copy of the requested portion of data is stored for addresses of the requested data;

(c) sending a message to the requesting node from the global coherence unit indicating in which node the most current copy of the requested data is stored;

(d) sending a request to transfer data from the requesting node to the node in which the most current copy of the requested data is stored; and (e) transferring to the requesting node, in response to the request to transfer, the most current copy of the requested data.

2. A method for maintaining cache coherence in a tightly coupled multiprocessor system having a plurality of nodes coupled to an interconnecting bus and storing portions of shared data, each node having a cache, a local coherence unit, a memory device and a processor device, the memory and processor device being coupled to form a memory/processor pair, the processor device within each node being capable of accessing data from the local memory device, the local cache, or over the interconnecting bus, from a non-local memory device, or a non-local cache, the method including the steps of:

(a) checking a local coherence unit to determine with a single data entry in a table whether a most current copy of a requested portion of data is stored locally, in response to a request by a requesting processor associated with that local coherence unit for the requested portion of data;

(b) if the most current copy of the requested portion of data is not stored locally, then checking a global coherence unit to determine in which node the most current copy of the requested portion of data is stored for addresses of the requested data;

(c) sending a request from the global coherence unit to the node in which the most current copy of the data is stored to transfer the most current copy of the requested portion of the data to the requesting node; and (d) sending, in response to the global coherence unit request, the most recent copy of the requested data to the requesting node.

3. The method of claim 2, further including the steps of:

sending to the global coherence unit, the most current copy of the data from the node in which the most recent copy of the data is stored; and sending to the requesting node, from the global coherence unit, the most recent copy of the requested data.

4. A method for maintaining cache coherence in a tightly coupled multiprocessor system having a plurality of nodes coupled to an interconnecting bus and storing portions of shared data, each node being capable of accessing data from the local memory device, the local cache, or over the interconnecting bus, from a non-local memory device, or a non-local cache, the method including the steps of:

(a) writing new data to a local cache within a first node having a cache, a local coherence unit, a memory device and a processor device, the memory device and processor device being coupled to form a memory/processor pair;

(b) updating a table of the local coherence unit within the first node to indicate with a single data entry that the most current copy of the data is stored in the local cache within the first node; and (c) updating the global coherence unit to indicate that the most current copy of the data is stored in the local cache within the first node for addresses of the shared data.

5. The method of claim 4, wherein the data is stored at an associated virtual address within one of the memory devices, further including the step of:

copying the written data from the local cache within the first node to the local memory device at the virtual address associated with the data.

6. A method for maintaining cache coherence in a tightly coupled multiprocessor system having a plurality of nodes coupled to an interconnecting bus and storing portions of shared data, each node being capable of accessing data from the local memory device, the local cache, or over the interconnecting bus, from a non-local memory or a non-local cache, the method including the steps of:

(a) writing new data to a local cache within a first node having a cache, a local coherence unit, a memory device, and a processor device, the memory device and processor device being coupled to form a memory/processor pair;

(b) checking a single data entry of a table maintained in the node to determine whether the most current copy of the data is in the local cache;

(c) if the most current copy of the data is not in the local cache, then checking the same data entry to determine whether the local coherence unit indicates that the most current copy of the data is in the local memory;

(d) if the most current copy of the data is not in the local memory, then updating a global coherence unit that stores data addresses of the shared data and updating the local coherence unit to indicate that the local cache has the most current copy of the data; and (e) if the most current copy of the data is in the local memory, then updating the local coherence unit to indicate that the most current copy of the data is in the local cache.

* * * * *